W. D. BALDWIN & A. SUNDH.
INDICATOR FOR CARS.
APPLICATION FILED JAN. 16, 1905.
973,334.
Patented Oct. 18, 1910.
3 SHEETS—SHEET 2.
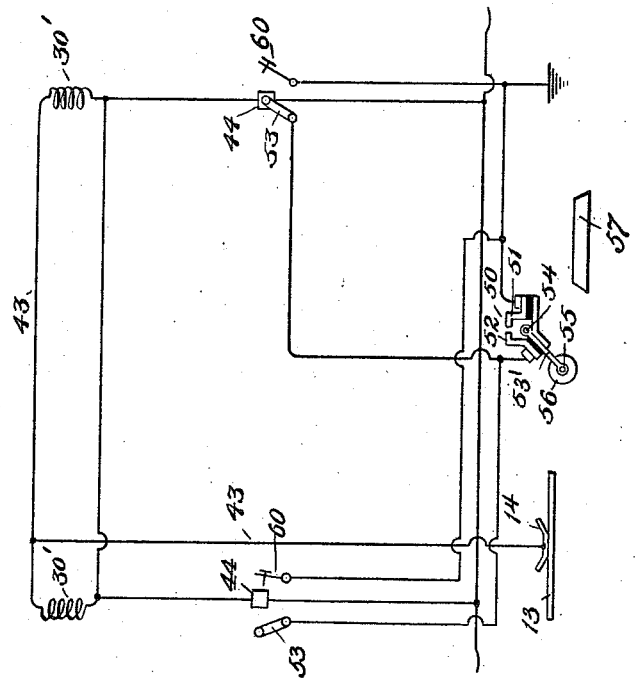
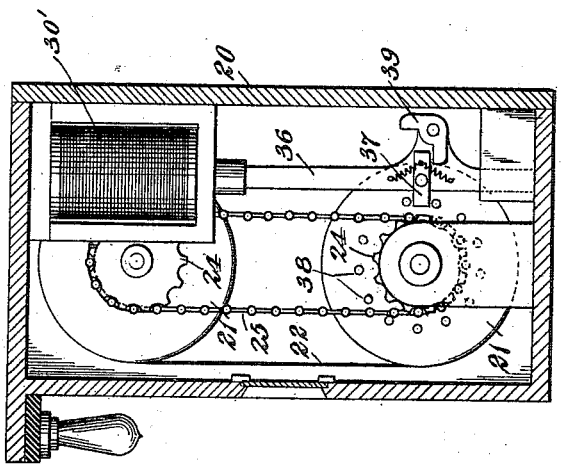
WITNESSES:
Henry E. Kirby
Walter C. Strang
INVENTORS
William D. Baldwin
& August Sundh
BY
E. W. Marshall
ATTORNEY

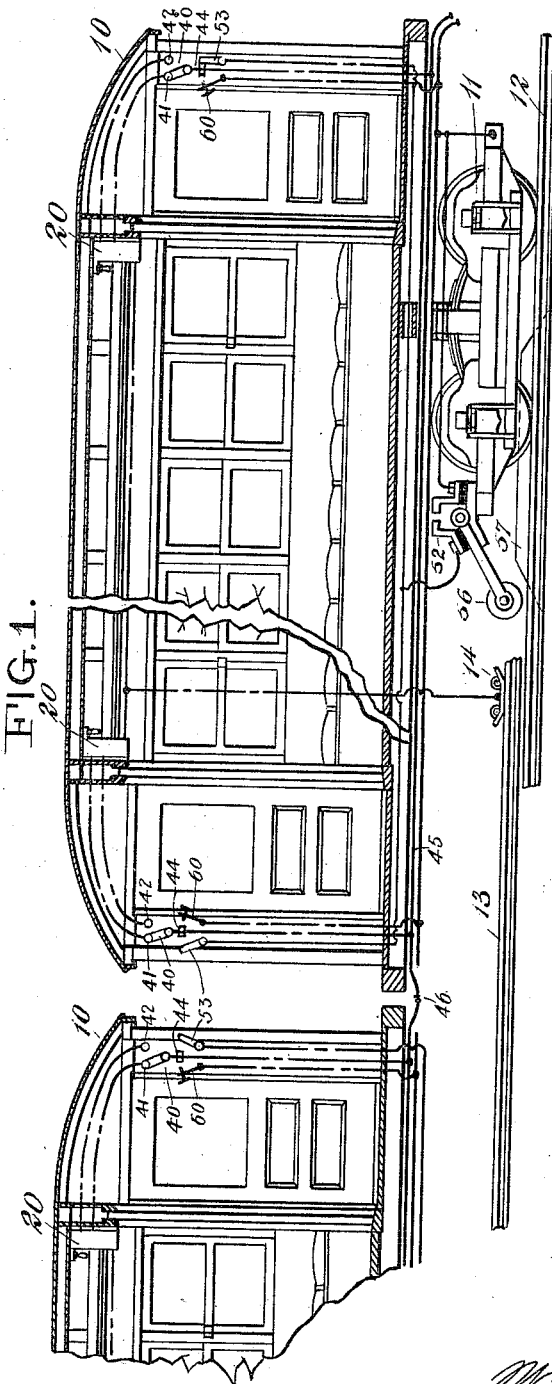

W. D. BALDWIN & A. SUNDH.
INDICATOR FOR CARS.
APPLICATION FILED JAN. 16, 1905.

973,334.

Patented Oct. 18, 1910.

3 SHEETS—SHEET 3.

Witnesses
Henry E. Kirby
Walter C. Strang

Inventors
William D. Baldwin
A. August Sundh
By their Attorney
E. W. Marshall

THE NORRIS PETERS CO., WASHINGTON, D. C.

UNITED STATES PATENT OFFICE.

WILLIAM D. BALDWIN, OF NEW YORK, AND AUGUST SUNDH, OF YONKERS, NEW YORK.

INDICATOR FOR CARS.

973,334.         Specification of Letters Patent.         Patented Oct. 18, 1910.

Application filed January 16, 1905. Serial No. 241,327.

*To all whom it may concern:*

Be it known that we, WILLIAM D. BALDWIN and AUGUST SUNDH, citizens of the United States, residing, respectively, in the borough of Manhattan, in the city, county, and State of New York, and in the city of Yonkers, in the county of Westchester and State of New York, have invented certain new and useful Improvements in Indicators for Cars, of which the following is a specification.

Our invention relates to indicators and is particularly adapted for use on one or more cars of a moving train, but may have a general application.

One of the objects of the present invention is to provide simple and improved means for operating indicators to indicate, for instance, the various stations in any desired number of places in a car or in several cars of a train.

A further object of the invention is to provide simple and efficient means for operating indicators either manually or automatically to indicate the various stations along the route of a car or a train of cars.

Other objects of the invention will appear hereinafter, the novel combinations of elements being set forth in the appended claims.

Like characters of reference designate corresponding parts in all of the figures.

Figure 4:
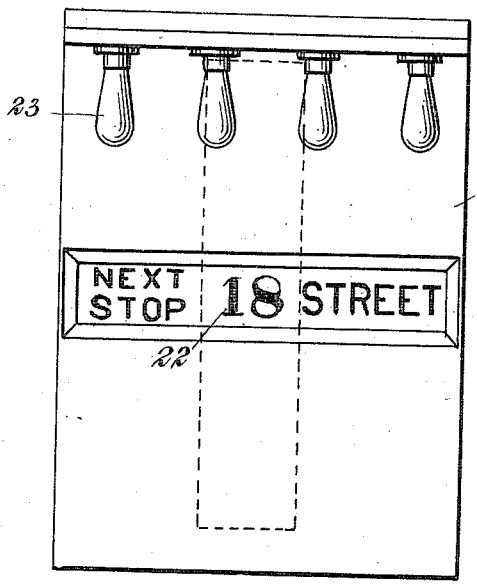
Figure 5:
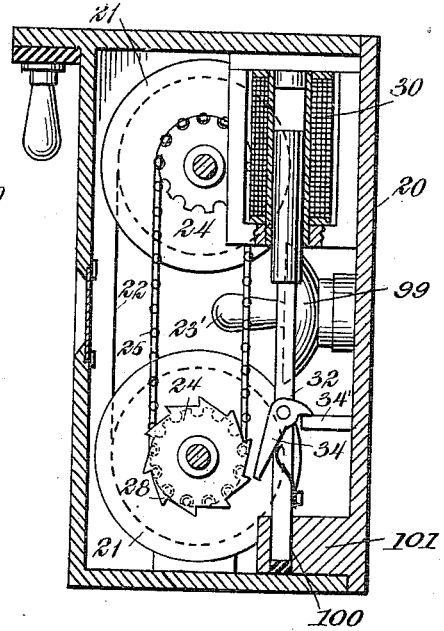
Figure 7:
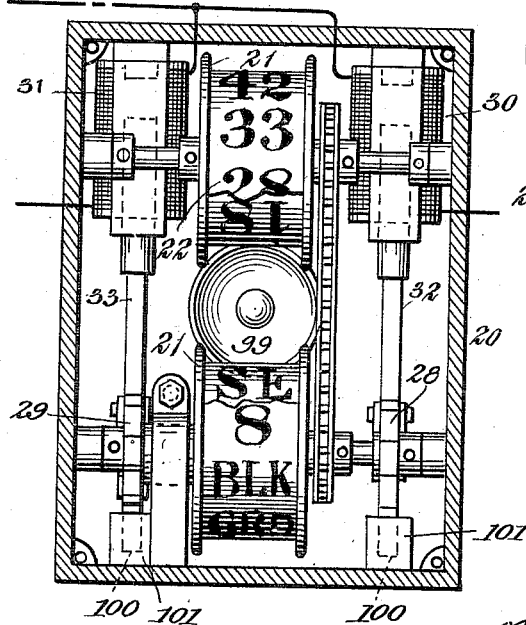
Figure 6:
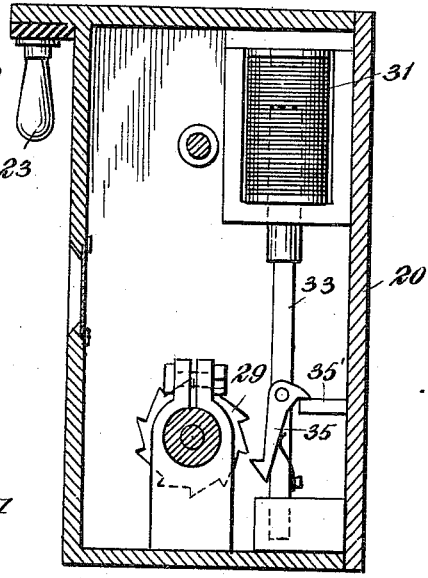

In the accompanying drawings Figure 1 shows certain parts of two railway cars in elevation and partly in section and shows our invention applied thereto; Fig. 2 is a diagram of the wiring of a preferred form of our invention; Fig. 3 is a diagram of the wiring of a modification; Fig. 4 shows one of the station indicators in front elevation; Fig. 5 is a sectional side elevation of a station indicator with a section taken through one of its operating magnets; Fig. 6 is another sectional side elevation showing the other operating magnet; Fig. 7 is a front elevation of a station indicator with its cover removed and certain parts broken away to show the arrangement of the operating magnets and their connected parts; and Fig. 8 shows a modification of the indicator mechanism in that it includes but one magnet.

Referring to Fig. 1, 10 designates a railroad car, 11 a car truck, and 12 the rails upon which it is run.
13 designates a contact or third rail which is connected to a source of electric power. 14 designates contact shoes in engagement with the contact rail 13, and 20 designates electrically operated station indicators in the cars, preferably at the ends thereof. These indicators may comprise two rolls or spools 21, 21 upon which is rolled a band or ribbon 22 which carries on it the names of the stops or stations, or any other desired symbol. The face of the indicator may have fixed letters upon it if desired, with which the movable symbols may be joined. An example of this is shown in Fig. 4, in which the words "Next stop —— street" are shown on the front or face of the indicator casing, with a space between, into which space the words or symbols on the movable ribbon 22 are moved. It is sometimes desirable to have the face of these station indicators illuminated; lamps may be provided for this purpose, as those designated 23. Another incandescent electric lamp 23' is shown inside of the indicator. The light of the latter lamp may be reinforced by a reflector 99 as shown. Whenever an interior lamp is thus used the ribbon on which are the names of the stations may be made of transparent or translucent material, or it may be perforated so that the light may show the symbols which are on it.

The mechanism which is used to move the ribbon in the indicator will now be described. The two spools 21, 21 are suitably joined at a given distance apart. A chain or sprocket wheel 24 is connected to rotate with each of these spools and an endless sprocket chain 25 is associated with these wheels. This insures the two spools moving together at the proper relative speed so that as the ribbon is unwound from one spool it is wound onto the other. The names of the stations are placed on the ribbon at intervals corresponding to the lengths of the steps given by the actuating mechanism.

Referring to Fig. 7 it will be seen that there are two electro-magnets 31 and 30 within the indicator casing, one on each side of the upper spool 21. These electro-magnets each comprise a solenoid and a movable core or plunger. To the plungers are connected rods 33, 32 which extend downwardly and carry pawls 35, 34, respectively. On the shaft of the lower spool 21 are two ratchet wheels 29, 28, with which these magnetically operated pawls are adapted to coact. The magnets 31, 30 are arranged to reciprocate their cores or plungers at desired intervals in a way which will be set forth hereinafter. The teeth of the ratchet wheels and the length of stroke of the plungers of the operating magnets will determine the length of the steps of travel of the indicator ribbon. The pawl 34 which the magnet 30 controls is arranged as indicated in Fig. 5 to move the ratchet wheel 28 and its connected spool 21 only on the downward movement of the plunger, which downward movement is of course produced by the weight of the plunger and the rod connected therewith. It is evident then that the magnet 30 is only capable of causing the movement of the indicator ribbon 22 in one direction and that direction is upward.

As indicated in Fig. 6, the magnet 31 controls the pawl 35 so that when the plunger is moved upwardly the ratchet wheel 29 will be actuated. This magnet then is capable of moving the indicator only in a downward direction. The pawls 35 and 34 are urged toward the ratchet wheels by leaf springs in this instance, which are carried by the rods 33 and 32, respectively. The fixed stops 35', 34' are placed in the path of projections extending from the pawls and are so arranged as to move the pawls automatically out of engagement with their ratchet wheels when the pawls are approaching their lowest position. In this way interference between the pawls is prevented. The operating magnets 31 and 30 are therefore so arranged that one of them will be used to move the indicator ribbon whenever the car or train is moving in one direction, and the other when the car is moving in the opposite direction. When these two operating magnets are thus used, a reversing switch is placed in each car which may be changed at the end of the run or at an intermediate point of travel of the car if the latter is to be run back. This reversing switch will be described hereinafter in connection with the electrical circuits.

Instead of the indicator mechanism above described, the arrangement shown in Fig. 8 may be used. Here only one magnet 30' is employed to move the indicating ribbon in both directions. In this case the rod 36 connected to the lower end of the plunger carries a pawl 37 which engages with pins 38 projecting laterally from one of the side faces of the lower spool 21. Back of this pawl 37 a movable mechanical stop 39 is provided which may be moved into two positions, one of which will permit the pawl to move freely past one of the pins 38 on the upward movement of the rod 36, but will cause the pawl to move one of the pins downwardly on the downward movement of the rod. This stop 39 in this instance is L-shaped and pivoted at an intermediate point to an extension from the rod 36. It is evident that this stop 39 may be connected with such extension so that there is sufficient friction between the two to cause the stop to be held where it is put.

The downward movement of the rod is of course caused by gravity acting on the core and rod. The core and rod at each side of the spools are restricted to a vertical movement, by reason of the fixed solenoid and the hole or recess 100 in the fixed block 101 in which the lower end of the rod fits and is adapted to move. Therefore, with the parts as indicated in Fig. 8, the rod 36 may be moved vertically in an upward direction and the pawl 37 will snap by the pin 38 just above the same, there being nothing to obstruct the movement of the right-hand end of the pawl 37. When the rod 36 returns, however, such right-hand end will be limited in its movement by the lower portion of the stop 39 so that the left-hand end of the pawl 37 will engage one of the pins 38 and rotate the lower spool 21 in a clockwise direction so as to move the indicator ribbon 22 upwardly one step. Centering springs hold the pawl 37 normally in a substantially horizontal position.

If the stop 39 is moved 90° from the position shown in Fig. 8, manually, the upper portion of the stop will take a position above the right-hand end of the pawl 37 and the lower portion of the stop will assume a substantially vertical position. The stop 39 being held where it is put, by friction, will now prevent the right-hand end of the pawl 37 from being moved upwardly. Therefore, when the plunger is now moved in an upward direction, one of the pins 38 will be engaged by the left-hand end of the pawl 37 so as to transmit motion to the lower spool 21 in an anti-clockwise direction and move the ribbon 22 downwardly one step. When the rod 36 returns the pawl 37 may snap by the pins 38 and again assume a horizontal position. It is therefore evident that a single magnet may be used to move the spools 21 and the indicating ribbon 22 in either direction. No reversing switch need be used when this form of station indicator is employed, as a mechanical stop 39 may be actuated manually and will perform the same function of effecting the reversal of movement of the indicator ribbon 22.

Referring now to Fig. 2, the operating circuits will be described. This diagram represents the arrangement of circuits for a train of three cars, each of which contains two station indicators 20. Each of these station indicators has two operating magnets 30, 31, and either of these magnets may be placed in circuit by means of the reversing switch 40 in each car which includes a movable switch blade and the fixed contacts 41 and 42. When this blade is placed on the contact 41, as shown in the diagram, the operating magnets 31 will be in circuit.

It will be seen that between each pair of operating magnets there is a common conductor 43 connecting them and connected also with the contact shoe 14 which rests upon the third rail or power rail 13. The other end of each of the magnets 31 is connected to the contacts 41, and the other ends of the magnets 30 are connected to the contacts 42. The stationary contact blocks 44 in each car are connected together by means of a train wire 45 which extends throughout the length of the train and is connected together between the cars by connectors 46.

At the lower part of the diagram under each car is shown an automatic switch 50 which comprises a stationary contact 51 and the movable contact 52. The latter is mounted upon, but insulated from, a pivoted lever 53' which is pivoted at 54 and extends downwardly to 55 where a roller is pivoted to it. The roller 56 extends, preferably, beneath the level of the car truck at about the level of the rails upon which the cars run. In the path of travel of this roller 56 at various fixed points along the track are placed stationary cams 57. These cams are so arranged that whenever a car moves over them the roller 56 which extends beneath the car will be lifted by the cam 57. This will move the pivoted arm 53' in an upward direction and cause the movable contact 52 which is carried upon it to be brought into electrical engagement with the stationary contact 51. The latter is grounded by being connected to the car truck, or in some other suitable manner.

A wire is led from the movable contact 52 to switch levers 53 in the car, which are so arranged that each may be moved into electrical connection with a corresponding stationary contact block 44 if desired. At the right-hand end of Fig. 2 the switch lever 53 is shown in engagement with the contact block 44, while the other switch levers in the train are shown disconnected from the blocks 44. In each car another switch lever 60 is provided, which is adapted to be moved manually into electrical connection with the corresponding stationary contact block 44. This switch lever 60 is also connected electrically to the ground in some suitable manner, as being connected to the car truck. These switch levers 60 are also arranged to be held normally away from the contact blocks 44, but may be pressed against the latter whenever desired, by hand.

The operation is as follows. If one of the switch levers 53 is brought into electrical contact with its stationary contact block 44, and one of the switches 50 is closed by a stationary cam 57, a circuit will be closed through one pair of the operating magnets in each car of the train, so that one magnet in each indicator will be energized. This is accomplished by the use of the wire 45 which passes through or is attached to all of the cars of the train. For instance, if the switch lever 53 engages contact 44 as indicated at the right-hand end of Fig. 2, and the contacts 51, 52 are closed, a circuit will be completed from each shoe 14 to and through coils 31 in each car in parallel. This circuit can be further traced through conductor 45, the switch comprising the lever 53 and block 44 at the extreme right of Fig. 2, and the contacts 52, 51 to the ground. This will cause such magnets to be energized to lift their cores or plungers and the parts connected thereto. As soon as the roller 56 runs off the stationary cam 57 the circuit which has been closed between the contacts 51, 52 will be opened, thus causing the magnets to be deënergized and their cores to drop. In this way the rods 32 and 33 or 36 will be given an up and down movement, which through their connected mechanism will cause the indicator ribbon 22 to be moved one step in one direction or the other. If all of the switch levers 53 are out of contact with the blocks 44, the automatic switches 50 underneath the cars will have no effect whatever on the station indicators.

The indicators may be moved, however, by an operator in the train pressing any one of the manual switch levers 60 against its opposing stationary contact block 44. By the closing of the switch comprising the lever 60 and the contact block 44, a circuit will be closed from the contact rail 13 through one of each pair of operating magnets to the ground, and the indicator ribbon will be moved in the manner already described.

When the modification shown in Fig. 8 is used, there will be no reversing switch necessary in the car, and the wiring will be somewhat simpler. In Fig. 3 we have shown the diagram for wiring one car with two station indicators, each of which is operated by one magnet only, as shown in Fig. 8. The operation of this device has already been described.

Obviously many variations may be made in the details of construction and arrangement of parts without departing from the spirit and scope of our invention as defined by the claims, and we wish therefore not to be understood as limiting ourselves to the exact construction disclosed.

Having thus fully described our invention, what we claim and desire to have protected by Letters Patent of the United States is:—

1. The combination with a plurality of cars, of one or more movable indicators for each car, each indicator bearing the names or numbers of the stations in successive order, a normally open circuit, electro-mechanical means in multiple in said circuit for actuating the said indicators, the said circuit comprising a single conductor extending through the cars and constituting a common return for the said circuit, a circuit-closer arranged to be automatically operated in advance of the cars reaching the station which is to be indicated, and one or more switches carried by each car to determine the direction of movement of the indicators.

2. The combination with a plurality of cars, of a movable station indicator carried on each car, two magnets for each indicator, an electric circuit, a reversing switch on each car for alternately connecting together in multiple in said circuit one set of electro-magnets including one electro-magnet for each indicator to actuate the latter in one direction, a plurality of devices, one connected with each of the remaining magnets to operate the respective indicators in the other direction, automatic means for closing the circuit to actuate whichever set of magnets is connected in the circuit, and additional manual means for closing said circuit.

3. The combination with a plurality of cars, of an indicator for each car, electro-mechanical devices for actuating such indicators in one direction, additional electro-mechanical devices for actuating the indicators in the reverse direction, an electric circuit in which said devices are included, a reversing switch on each car, and an automatic circuit-closer for each car.

4. The combination with a plurality of cars, of one or more indicators for each car, electro-mechanical devices arranged in pairs to actuate each indicator, an electric circuit running through the cars and connecting one of the actuating devices of each pair in multiple, the said circuit comprising a common return for all the actuating devices, and means for opening and closing the said circuit to cause the indicators to be actuated from a selected point.

5. The combination with a plurality of cars, of indicators for each car, electro-mechanical devices to actuate each indicator in opposite directions, an electric circuit including the electro-mechanical devices, a train wire for completing such circuit through the train of cars, and a circuit-closer for each car for effecting the simultaneous operation of all of the indicators in one direction.

6. The combination with a plurality of cars, of one or more indicators for each car, separate electro-mechanical devices for each indicator to actuate it in either of two directions, an electric circuit including the electro-mechanical devices, a train wire for completing such circuit through the train of cars, and an automatic circuit-closer for each car, any one of which is adapted to effect the operation of all the indicators.

7. The combination with a plurality of cars, of one or more indicators for each car, electro-mechanical devices for each indicator to actuate it in either direction, an electric circuit including the electro-mechanical devices, a reversing switch for each car, a manual and an automatic circuit-closer for each car, and a switch for each car to open the circuit of the automatic circuit-closer when desired.

8. In a signaling system for a train of cars, the combination with a plurality of indicators, one or more for each car, of a plurality of mechanical devices for each indicator for actuating said indicators in opposite directions, electro-magnets for operating said devices in either direction, a plurality of reversing switches to determine the direction of movement of the indicators, electric circuits and connections permitting the operation of one or more of said indicators from a selected point on any car, and automatic means for operating said indicators at a predetermined point in the travel of the train.

9. In a signaling system for a train of cars, the combination with a plurality of indicators, one or more for each car, of mechanical devices for actuating said indicators, two electro-magnets for each indicator, one to operate the same in one direction and the other to effect the operation of said indicator in the other direction, reversing switches for connecting one magnet of one indicator in parallel with one magnet of one or more of the other indicators, a plurality of manual switches, circuits and connections to effect the operation of one or more of said indicators by the actuation of any one of said manual switches, and one or more automatic switches arranged to be operated upon the train approaching a station to change the indication on the indicators.

In witness whereof, we have signed our names in the presence of two subscribing witnesses.

WILLIAM D. BALDWIN.
AUGUST SUNDH.

Witnesses:
W. H. BRADY,
ERNEST W. MARSHALL.